(No Model.)

H. F. BOCK.
FRYING PAN.

No. 310,365. Patented Jan. 6, 1885.

WITNESSES:
C. Neveux
C. Sedgwick

INVENTOR:
H. F. Bock
BY
ATTORNEYS.

UNITED STATES PATENT OFFICE.

HENRY FERDINAND BOCK, OF LANSING, ILLINOIS.

FRYING-PAN.

SPECIFICATION forming part of Letters Patent No. 310,365, dated January 6, 1885.

Application filed April 16, 1884. (No model.)

*To all whom it may concern:*

Be it known that I, HENRY F. BOCK, of Lansing, in the county of Cook and State of Illinois, have invented a new and Improved Double Pan for Frying or Cooking Purposes, of which the following is a full, clear, and exact description.

This invention relates to double pans for frying or cooking purposes, made of two longitudinal sections, each of which has a handle and pan-body, forming a complete pan, and the two being constructed and fitted together, so that they, both handles included, may either be used as a double or closed pan capable of being turned over on the fire, as required, or may be detached and used separately as independent pans, substantially as hereinafter described.

The invention consists in a novel construction of two pan bodies or sections by providing the rim on the face of the one pan-body with any number of extended side lips, and the rim on the face of the other pan-body with any number of inwardly-bent-over flanges, to provide for the easy engagement and thorough disengagement of the two pan-sections, when required, and of the close lock or fit of their bodies when engaged, as hereinafter described; and the invention furthermore consists in a hollow construction of the two handles of the double pan with a protuberance or nipple on the outer end portion of one of them, arranged to enter an aperture in the corresponding end portion of the other handle, whereby the two independent handles when brought together form a light single hollow handle of convenient shape, and said independent handles are firmly and easily locked together when closed, and as readily disengaged, when required, without the use of independent fastenings.

Reference is to be had to the accompanying drawings, forming part of this specification, in which similar letters of reference indicate corresponding parts in all the figures.

Figure 1:
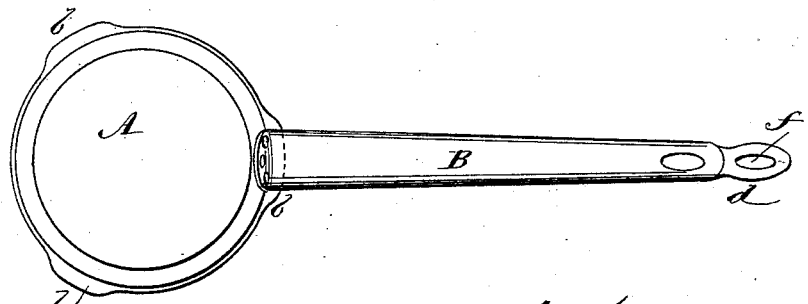
Figure 2:
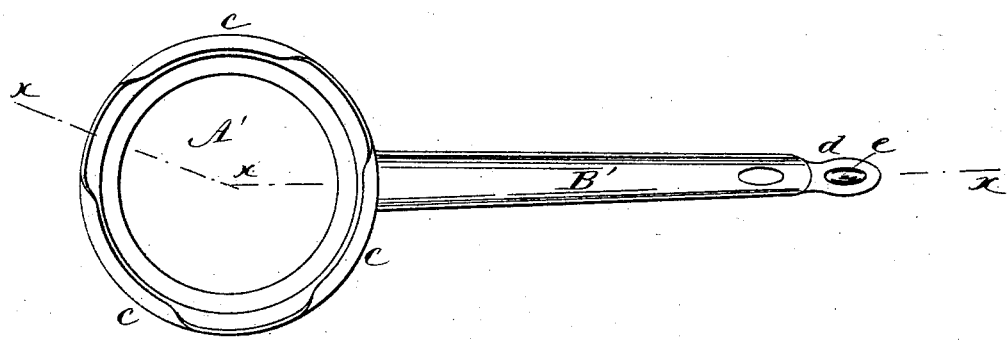
Figure 3:
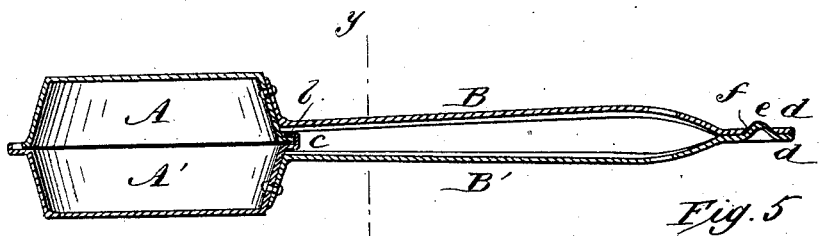

Figure 1 represents a longitudinal or face view of the two pan-sections detached from each other. Fig. 2 is a longitudinal section of said pan-sections when closed one upon the other, said section being taken in direction of the line $x$ $x$ in Fig. 1; Fig. 3, a transverse section thereof on the line $y$ $y$ in Fig. 2; and Figs. 4 and 5 are face views of the pan-sections, with the handles broken off, showing a modification.

A A' indicate the two pan-bodies, with attached handles B B', which may be made out of sheet metal. These pan-sections are separate one from the other, and are made to engage with and disengage from each other by constructing the rim on the face of the one pan-body, A, with extended side lips, $b$, and the rim on the face of the other pan-body, A', with inwardly-bent-over flanges $c$, within which the lips $b$ of the pan-body A may be made to enter by suitably placing and turning said pan-body A on the other pan-body, A', and, by reversing the turning action, may be as readily disengaged. This construction provides for a close and locked fit of the two pan-bodies together with their attached handles to form a double or shut pan, as shown in Figs. 2 and 3, and for the separate use of said pan-sections without having to couple or uncouple independent fastenings.

The handles B B' of these pan-bodies A A' are of convex form on their exterior faces, and of concave or hollow construction on their inside faces in transverse section, and of such tapering shape in direction of their length, terminating in flattened meeting outer end portions, $d$ $d$, that, when closed one upon the other in fitting the two pan-sections together, they unitedly form a light hollow handle of rounded or partially-oval configuration in transverse section convenient for grasp by the hand. They are held closed and the two pan-sections further locked or united with each other by a nipple or protuberance, $e$, pressed out of or formed in the flattened end portion of the one of said handles, arranged to engage, by slightly springing the handles, with an aperture, $f$, in the flattened end portion $d$ of the other handle. This forms a secure hold of the handles without the use of independent fastenings, and provides for their ready engagement and disengagement when required.

Figure 4:
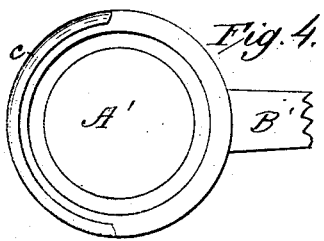
Figure 5:
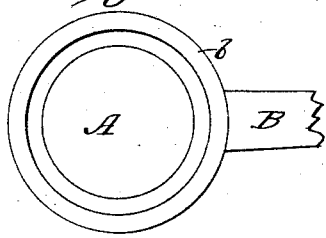

Instead of a series of bent-over flanges, $c$, on the rim of the one pan-body, there may be only one of such flanges, of a length of about half the circumference of the rim or less, and the other pan-body may be made with a continuous lip extending wholly around the rim, as shown in Figs. 4 and 5.

Having thus described my invention, I claim as new and desire to secure by Letters Patent—

1. In a double pan for frying or cooking purposes, composed of two longitudinal sections closing one upon the other and each having a handle and complete pan-body, the pan-bodies A A', provided the one of them with one or more bent-over flanges, c, on its rim, and the other of them with one or more rim-lips, b, arranged to engage with said flanges, for securely holding and locking the pan-bodies together and admitting of their ready disengagement when required, substantially as specified.

2. In a double pan for frying or cooking purposes, composed of two longitudinal sections closing one upon the other, and each having a handle and complete pan-body, the transversely-bent handles B B', constructed with meeting outer end portions, d d, the one of which is provided with a nipple or protuberance, e, and the other with an aperture, f, arranged to receive said nipple within or through it, essentially as and for the purposes herein described.

3. The combination, in a double pan, of the pan-bodies A A', provided with rim-locking lips and flanges b c, and the hollow handles B B', having meeting outer end portions, d d, provided with an engaging nipple and aperture e f, substantially as shown and described.

HENRY FERDINAND BOCK.

Witnesses:
JOHN BENZ,
S. E. ANDERSON.